US011851869B2

United States Patent
Royce

(10) Patent No.: US 11,851,869 B2
(45) Date of Patent: Dec. 26, 2023

(54) PRE-FABRICATED LINK SLAB—ULTRA HIGH PERFORMANCE CONCRETE

(71) Applicant: Mathew Chirappuram Royce, Fredericksburg, VA (US)

(72) Inventor: Mathew Chirappuram Royce, Fredericksburg, VA (US)

(*) Notice: Subject to any disclaimer, the term of this patent is extended or adjusted under 35 U.S.C. 154(b) by 0 days.

(21) Appl. No.: 17/234,951

(22) Filed: Apr. 20, 2021

(65) Prior Publication Data

US 2022/0412069 A1 Dec. 29, 2022

(51) Int. Cl.
*E04B 1/04* (2006.01)

(52) U.S. Cl.
CPC .................. *E04B 1/043* (2013.01)

(58) Field of Classification Search
USPC ......... 52/223.1, 223.6, 250, 251, 319, 586.2
See application file for complete search history.

(56) References Cited

U.S. PATENT DOCUMENTS

| | | | | |
|---|---|---|---|---|
| 983,274 | A * | 2/1911 | Graham ................... | E04C 5/012 52/659 |
| 3,794,433 | A * | 2/1974 | Schupack ................. | E01D 2/04 404/1 |
| 3,808,085 | A * | 4/1974 | Givens, Jr. ............. | E01D 19/125 428/401 |
| 4,015,302 | A * | 4/1977 | Clark ....................... | E01D 19/06 404/69 |
| 5,218,795 | A * | 6/1993 | Horstketter ............. | E04B 5/046 52/126.5 |
| 5,664,378 | A * | 9/1997 | Bettigole .............. | E01D 19/125 404/70 |
| 6,568,139 | B2 * | 5/2003 | Bot .......................... | E04B 5/04 52/250 |
| 6,578,343 | B1 * | 6/2003 | Dumler ..................... | E04B 5/38 52/783.17 |
| 7,134,805 | B2 * | 11/2006 | Yee ........................ | F16L 13/113 52/592.1 |
| 8,911,173 | B2 * | 12/2014 | Ulislam .................... | E01C 5/06 52/223.6 |
| 9,546,454 | B2 * | 1/2017 | Sanders ................... | E01C 7/147 |
| 9,556,566 | B2 * | 1/2017 | Sanders ..................... | E01C 5/06 |
| 9,920,490 | B2 * | 3/2018 | Sylvester ................. | E01C 5/08 |
| 10,280,628 | B2 * | 5/2019 | Yin ................... | E04F 15/02405 |
| 10,323,368 | B2 * | 6/2019 | Mullaney ................ | E02D 27/01 |
| 11,072,925 | B2 * | 7/2021 | An ........................... | E04B 5/19 |
| 11,104,033 | B2 * | 8/2021 | Sylvester ................. | E01C 5/06 |

(Continued)

FOREIGN PATENT DOCUMENTS

CN 105113405 A * 12/2015
KR 20160127463 A * 11/2016

*Primary Examiner* — Joshua K Ihezie
(74) *Attorney, Agent, or Firm* — PATENT PORTFOLIO BUILDERS PLLC

(57) ABSTRACT

Disclosed invention comprises innovations related to the fabrication process and the associated design of Prefabricated Link Slabs made using Ultra High-Performance Concrete (UHPC) for bridges hereinafter referred as PLS-UHPC. This disclosure is regarding methods of designing, manufacturing, and installing PLS-UHPC as connections between bridge spans. The invention includes the concept of installing PLS-UHPC which will provide numerous benefits such as faster construction in the field, and better maintenance of established systems.

11 Claims, 6 Drawing Sheets

(56) References Cited

U.S. PATENT DOCUMENTS

| | | | |
|---|---|---|---|
| 11,149,384 B2* | 10/2021 | Smith | E01C 23/10 |
| 2003/0061672 A1* | 4/2003 | Eustace | E01D 21/00 |
| | | | 14/77.1 |
| 2005/0115195 A1* | 6/2005 | Bettigole | E01D 19/125 |
| | | | 52/782.1 |
| 2006/0162102 A1* | 7/2006 | Nelson | E01D 2/02 |
| | | | 14/77.1 |
| 2007/0081858 A1* | 4/2007 | Yee | E04B 5/04 |
| | | | 404/40 |
| 2009/0183321 A1* | 7/2009 | Boresi | E01F 5/005 |
| | | | 405/125 |
| 2009/0308005 A1* | 12/2009 | Ireland | E04B 1/046 |
| | | | 52/250 |
| 2011/0016645 A1* | 1/2011 | Porter | E01D 22/00 |
| | | | 405/232 |
| 2014/0137492 A1* | 5/2014 | French | E04C 2/06 |
| | | | 52/223.6 |
| 2015/0078822 A1* | 3/2015 | Backhaus | E01C 5/06 |
| | | | 404/47 |
| 2015/0167260 A1* | 6/2015 | Siqueiros | E01C 5/06 |
| | | | 404/99 |
| 2018/0135261 A1* | 5/2018 | Nelson | E01D 2/02 |
| 2019/0257081 A1* | 8/2019 | Heatly | E04F 15/02405 |
| 2019/0309488 A1* | 10/2019 | Li | E01D 19/067 |
| 2021/0301483 A1* | 9/2021 | Stancescu | E01D 21/00 |

\* cited by examiner

PRE-FABRICATED LINK SLAB—ULTRA HIGH PERFORMANCE CONCRETE

BACKGROUND OF THE INVENTION

Field of the Invention

The present invention is related to Prefabricated Link Slabs made using Ultra High-Performance Concrete (UHPC) for bridges, hereinafter referred as PLS-UHPC. This disclosure is specifically regarding methods of designing, manufacturing, and installing PLS-UHPC as connections between bridge spans as an alternative to bridge deck joint systems.

Description of Prior Art

State of the art methods for connecting the superstructures at intermediate supports for multi-span bridge superstructures are:

Connection by making the bridge superstructure continuous, which means that the contiguity of beams/girders are maintained at intermediate supports. Superstructure continuity at intermediate supports will resist both the relative translation between adjacent superstructure spans due to temperature changes and the rotation of the superstructures at the support due to gravity loads.

Continuous superstructure is widely used today and is a viable and economic solution for new superstructure construction of multi-span bridges, however, most of the bridges currently in service are with superstructures discontinuous at the intermediate supports with deck joints systems connecting the decks of adjacent superstructures.

Connection by deck joint system, which is a method establishing contiguity of riding surface at the intermediate supports that will allow both the relative translation between adjacent superstructures due to temperature changes and the rotation of the superstructures due live loads. The deck joint system provides a safe and contiguous riding surface and stops deck drainage from flowing on to the bridge components below the deck surface.

Most of the joints in service leak runoff water from the deck onto the superstructure and the substructure of the bridge under them. This leaking water has a high concentration of deicing chemicals in areas where such chemicals are used in the winter.

Bridges are currently designed to provide a service life of 75 years. Exposure to chlorides, most commonly from leaking joints, causes deterioration of bridges necessitating significant repairs even before mid point of its service life. Corrosion caused by leaking deck joint systems has been established as the main cause of bridge deterioration in the US, and in many other parts of the world.

The inability of deck joint systems constructed using state of the art practices to provide leak resistant connectivity between spans of bridges has accelerated the deterioration of bridges, especially in areas where deicing chemicals are used as they contain high amounts of chloride.

Connection by constructing a cast-in-place Link Slab made of Conventional Concrete (LS-CC), cast-in-place Link Slab made of Engineered Cememitious Composites (LS-ECC), or cast-in-place Link Slab made of Ultra High Performance Concrete (LS-UHPC) at intermediate supports. Link slabs described above will resist the relative translation between adjacent superstructures due to temperature changes while accommodating the rotation of the superstructures at the support due to live loads. The rotational demands of the superstructure at supports are met by bending of the link slabs. The durability of link slab depends on its ability to resist moisture penetration from the top surfaces into the interior of the slab by limiting the crack widths to microscopic levels at the maximum bending demand. LS-CC and LS-ECC at the maximum bending demand will produce cracks that will allow moisture and chloride penetration resulting in its accelerated deterioration. Replacements of LS-CC and LS-ECC are to be expected during the service life of bridge decks due to this deterioration. Link slabs made using UHPC have significantly higher durability compared to links slabs constructed using CC or ECC. The strain hardening property of UHPC enables LS-USPC to meet the maximum rotational demand by producing multitudes of tight cracks that are impermeable to moisture and chlorides.

Casting-in-place is the state of the art method of constructing the LS-UHPC. This method of construction requires multiple days of field work and is not suitable for situations where only short time bridge closures can be allowed.

The combined expense of mobilization, conducting Quality Control (QC) tests and placing and curing a few cubic yards UHPC at each link slab location is prohibitively expensive.

SUMMARY OF THE INVENTION

This invention is the concept and method of designing and fabricating Prefabricated Link Slabs in a factory environment made using Ultra High-Performance Concrete (PLS-UHPC). The invention has the potential to overcome all the major shortcomings of the prior art as identified in this disclosure.

DESCRIPTION OF DRAWINGS

All descriptions herein with reference to the figures are not limiting, and can be understood as features of varying details of the presented embodiment. The features, components, elements and/or aspects of the illustrations can be reorganized, re-sequenced and/or interchanged with other materials without effectively departing from the disclosed invention. The geometry of the components is exemplary and can be altered without effectively affecting or limiting the disclosed invention.

The drawings and associated descriptions of the preferred embodiment of the invention shall be treated as an example and is intended for making the invention readily apparent to those with ordinary skill in the art. The presentation of the preferred embodiment of the invention shall not be regarded as limiting since the invention is capable of other embodiments and can be practiced or carried out in multiple ways.

DETAILED DESCRIPTION OF THE EXEMPLARY EMBODIMENTS

This invention is the concept of and method for designing and fabricating PLS-UHPC in a factory environment and installing it on a new or existing structure. This invention eliminates all major shortcomings of the prior art identified in this disclosure.

The size, shape, and structural design of the PLS-UHPCs exhibited in this disclosure is exemplary and this invention is inclusive all appropriate modification to these aspects necessitated by a specific application of this invention.

The strength, toughness, functionality, crack resistance, and corrosion resistance of PLS-UHPCs are far superior to cast-in-place LS-CC and cast-in-place LS-ECC.

PLS-UHPCs are not only better quality and relatively defect free, but can also be installed faster and at a lower cost compared to Cast-In-Place LS-UHP.

The size, shape, other structural aspects of PLS-UHPCs are to be designed for each specific application based on the geometry and the structural aspects of the connecting spans of any specific bridge.

Description of the Preferred First Embodiment

Figure 1:
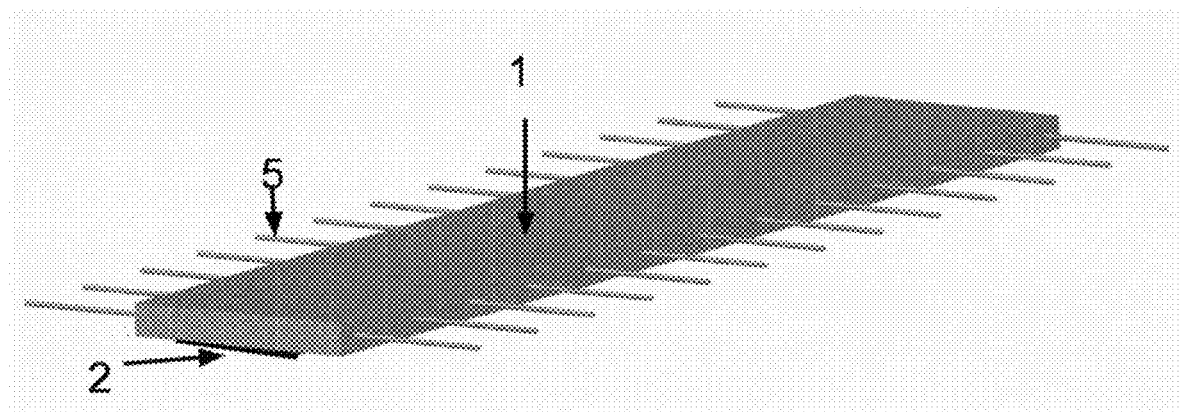
FIG. 1 is a representation of a three-dimensional digital model of the preferred first embodiment of the present invention prior to its incorporation into a bridge deck or any other applicable structure.

FIG. 1 is a representation of a three-dimensional digital model of the preferred first embodiment of the present invention prior to its incorporation into a bridge deck or any other applicable structure.

(1) The prismatic portion of the Prefabricated Link Slab. This central part of the Prefabricated Link Slab is made using Ultra High-Performance Concrete (PLS-UHPC) as per this invention and manufactured under a controlled environment under strict Quality Control and Quality Assurance procedures. This production method and environmental controls enable the use of materials with significantly better physical properties and durability characteristics and eliminates all negatives identified in the prior art in this disclosure.

(2) is a debonding layer attached to the bottom of (1) for strain isolation of a portion of (1) from the supporting concrete deck.

(5) is reinforcing bars for (1) that are projecting from the sides. The interior portion of (5) is not visible in this model.

Figure 2:
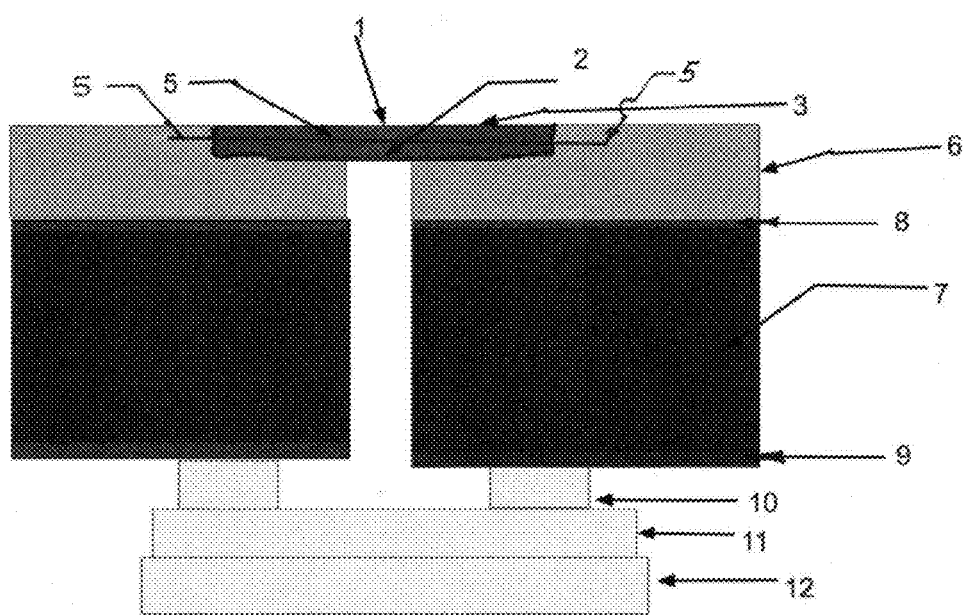
FIG. 2 is a sectional view of the preferred first embodiment of the invention as part of a bridge superstructure, taken perpendicular to the center lines of bearings at an intermediate support used in conjunction with the construction of new or replacement decks of adjacent spans.

FIG. 2 is a sectional view (1) PLS-UHPC as part of a bridge superstructure, taken perpendicular to the center lines of bearings at an intermediate support used in conjunction with the construction of new or replacement decks of adjacent spans of a bridge.

Refer to FIG. 1 for descriptions of (1), (2) and (5)

(6) are conventional new concrete bridge decks constructed using the state of the art bridge construction practices.

(7) Steel Girder Web, (8) Steel Girder Top Flange, (9) Steel Girder Bottom Flange are parts of a conventional steel bridge superstructure shown in this figure. A similar setup is implied for a superstructure with concrete girders.

(10) Bridge Bearings supporting steel or concrete girders are routinely used in the state-of-the-art practice in bridge construction.

(11) Pedestals, (12) Bridge Seat are parts of bridge substructure and are routinely used in the state-of-the-art practice in bridge construction.

Figure 3:
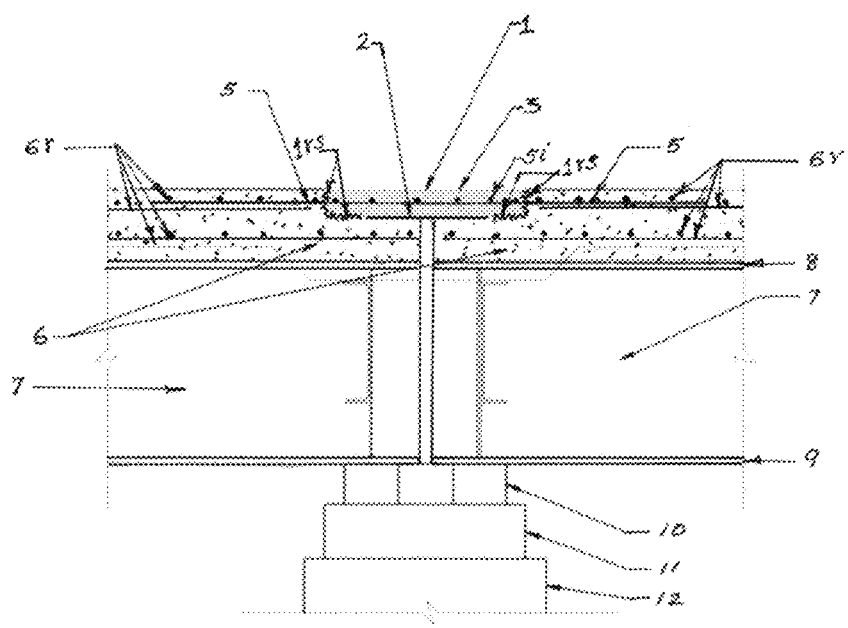
FIG. 3 is a more detailed description of FIG. 2

FIG. 3 is a more detailed view of the same section shown in FIG. 2.

See FIG. 1 and FIG. 2 for descriptions of (1), (2), (3), (5), (6), (7), (8), (9), (10), (11) and (12)

(1rs) roughened surfaces of (1) that are intended to bond with (6).

(5i) is the internal reinforcing bars that are not protruding out of (1).

(6r) is reinforcements routinely used in the state of the art practice of constructing (6) bridge decks.

Figure 4:
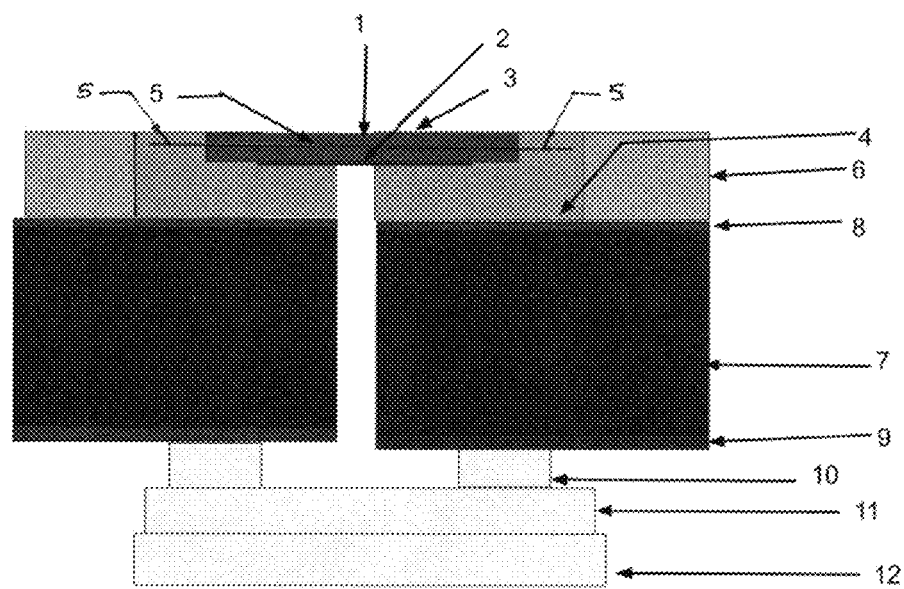
FIG. 4 is a sectional view of the preferred first embodiment of the invention as part of a bridge superstructure, taken perpendicular to the center lines of bearings at an intermediate support when used as the replacement of an existing bridge deck joint.

FIG. 4 is a sectional view of the preferred first embodiment of the invention as part of a bridge superstructure, taken perpendicular to the center lines of bearings at an intermediate support when PLS-UHPC is used as the replacement of an existing bridge deck joint.

See FIG. 1 and FIG. 2 for descriptions of (1), (2), (3), (5), (6), (7), (8), (9), (10), (11) and (12)

(6E) are existing, concrete bridge decks. Only portions of the existing decks need to be removed and replaced during the installation of (1).

(4) is the closure concrete pour between the (1) and the (6E) in a joint replacement application where existing deck joints are replaced with (1)

Figure 5:
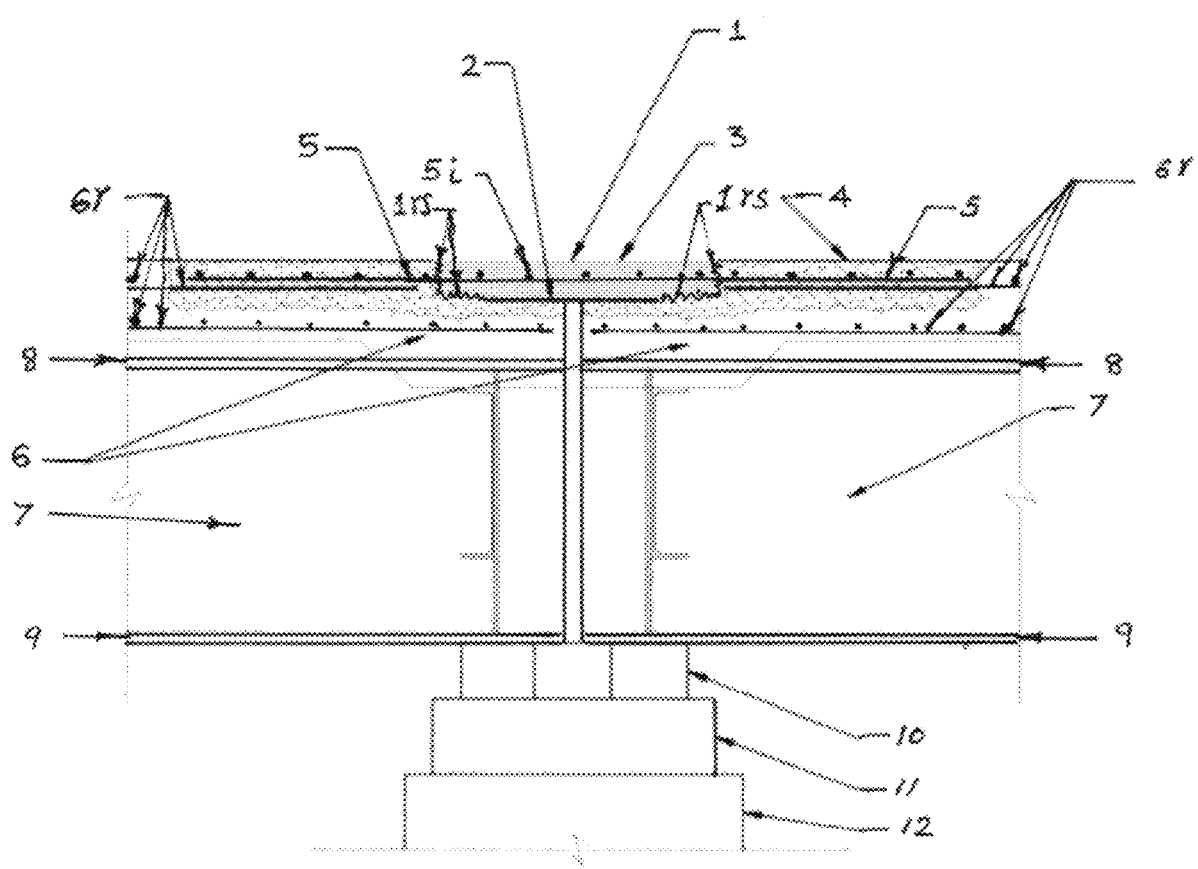
FIG. 5 is a more detailed description of FIG. 4.

FIG. 5 is a more detailed view of the same section shown in FIG. 2.

See FIG. 1 and FIG. 2 for descriptions of (1), (2), (3), (5), (6), (7), (8), (9), (10), (11) and (12) See FIG. 4 for descriptions of (1rs), (4), (6E), (5i) and (6r)

Figure 6:
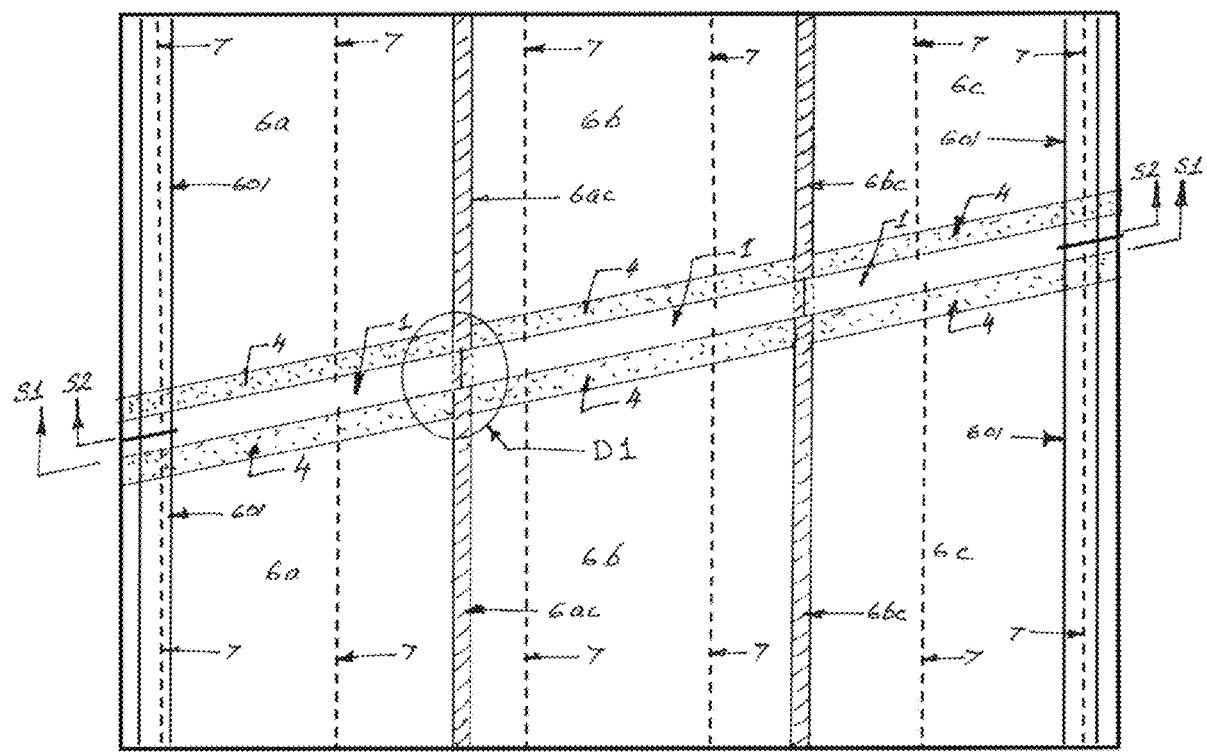
FIG. 6 is a plan view of the bridge deck incorporating the preferred first embodiment of the invention in conjunction with the construction of new or replacement decks of adjacent spans when the entire width of the deck is constructed in three stages. The presentation of a three-stage construction sequence is exemplary, the applicability of this invention in a plurality of stages and sequences are implied. Only the relevant part of the bridge deck near an intermediate support is presented.

FIG. 6 is a plan view of the bridge deck incorporating the preferred first embodiment of the invention in conjunction with the construction of new or replacement decks of adjacent spans when the entire width of the deck is constructed in three stages. Only the relevant part of the bridge deck near an intermediate support is presented.

Refer to FIG. 1 and FIG. 2 for description for (1)

See FIG. 2 for descriptions of (7)

Figure 8:
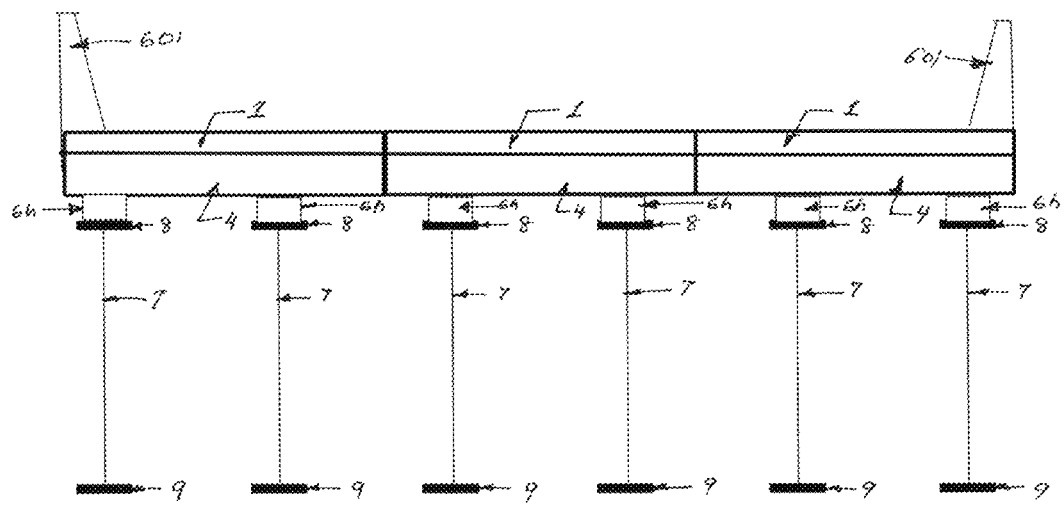
FIG. 8 is a sectional view of the bridge superstructure at location S1:S1 shown in FIG. 6 and FIG. 7.

Refer to FIG. 8 for section S1:S1

Figure 9:
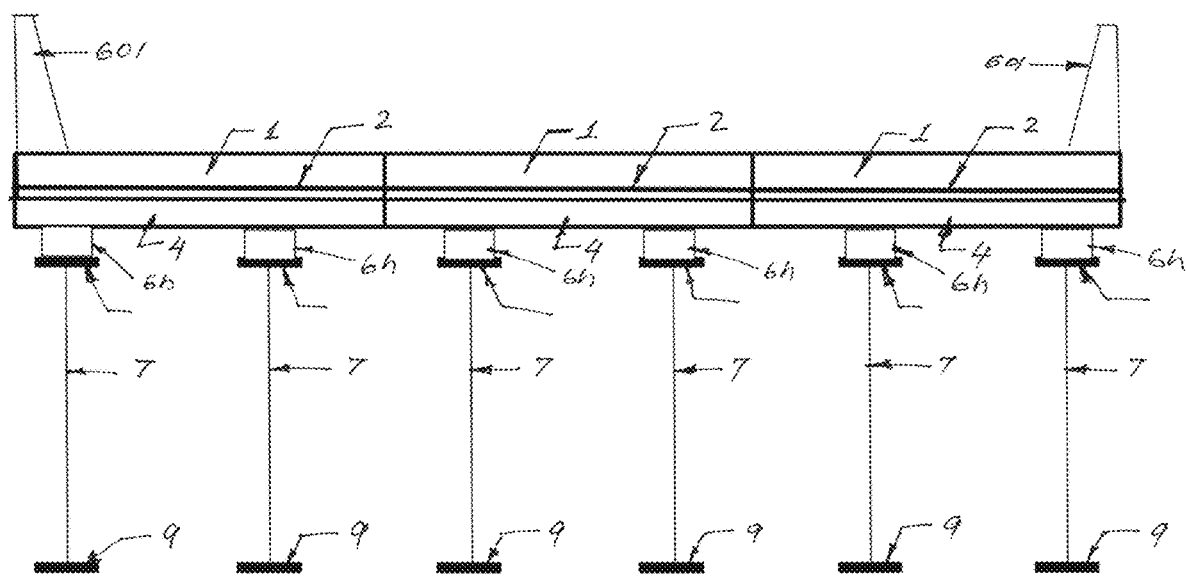
FIG. 9 is a sectional view of the bridge superstructure at location S2: S2 shown in FIG. 6 and FIG. 7.

Refer to FIG. 9 for section S2:S2

(6a), (6b) and (6c) are segments of (6) constructed in 3 stages. Number of stages and order of construction is exemplary.

(6ac) is the closure concrete pour between segments (6a) and (6b).

(6bc) is the closure concrete pour between segments (6b) and (6c).

Figure 7:
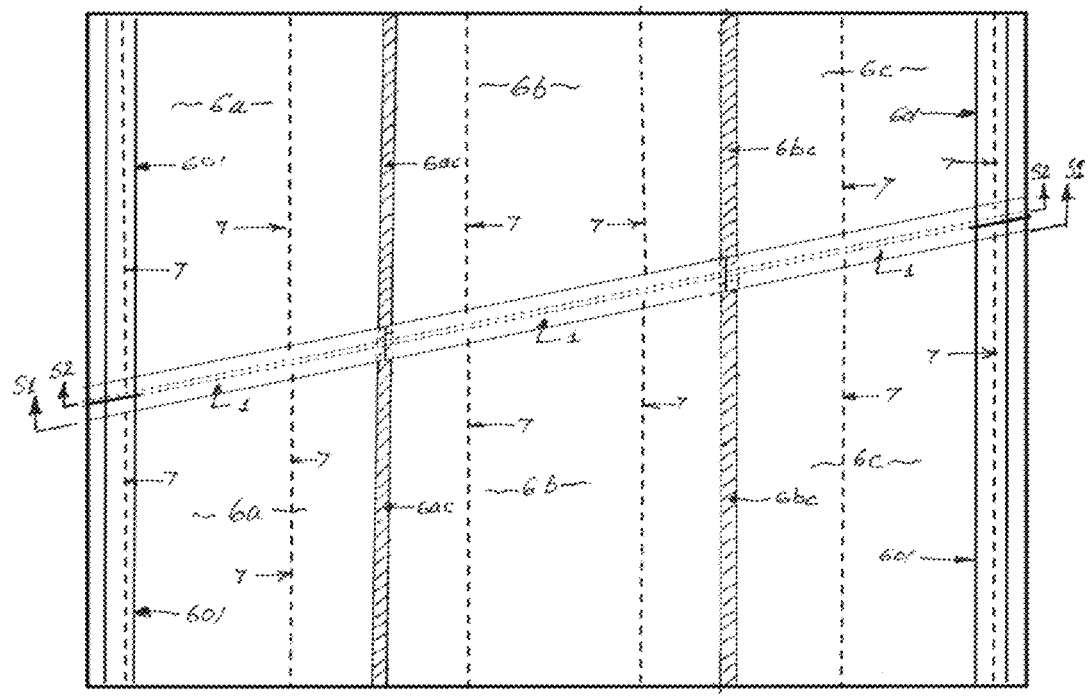
FIG. 7 is a plan view of a bridge deck incorporating the preferred first embodiments of the invention to replace an existing deck joint with between decks of adjacent spans of an existing bridge when the entire width of the deck is constructed in three stages. The presentation of a three-stage construction sequence is exemplary, the applicability of this invention in a plurality of stages and sequences are implied. Only the relevant part of the bridge deck near an intermediate support is presented.

(601) is concrete barrier which is a part of conventional bridge superstructure shown in this figure. Bridge Railing Systems is an alternate for concrete barriers and FIG. 7 is a plan view of the bridge deck incorporating the preferred first embodiment of the invention in conjunction with the construction of replacement decks joint with PLS-UH PC in three stages. Only the relevant part of the bridge deck near an intermediate support is presented.

Refer to FIG. 1 and FIG. 2 for description for (1)
See FIG. 2 for descriptions of (7)
See FIG. 6 for descriptions of (601)
Refer to FIG. 8 for section S1:S1
Refer to FIG. 9 for section S2:S2

FIG. 8 is the view of section S1:S1 as shown on FIG. 6 and FIG. 7.

See FIG. 1 and FIG. 2 for descriptions of (1), (7), (8), and (12)
See FIG. 6 for descriptions of (601)
FIG. 4 for descriptions of (4)

(6h) are concrete fill between (6) and (8) used in the state-of-the-art practice in bridge deck construction.

FIG. 9 is the view of section S2:S2 as shown on FIGS. 6 and 7

See FIG. 1 and FIG. 2 for descriptions of (1), (2), (7), (8), and (12)
See FIG. 6 for descriptions of (601)
FIG. 4 for descriptions of (4)

(6h) are concrete fill between (6) and (8) used in the state of the art practice in bridge deck construction.

Design Method

PLS-UHPC's are designed based on the bridge type, geometry, superstructure type, and the design load.

The prismatic portion of the PLS-UHPC will be custom designed. The objective of the design is to limit maximum tensile strain at service limit states not to exceed 50% the maximum tensile strain capable of sustaining post crack tensile strength which is equal to or greater than the pre-crack tensile strength. The sustained post crack behavior of UHPC is utilized to achieve this design objective.

Fabrication Method (1) The prismatic portion of the Prefabricated Link Slab can be fabricated using a plurality of fabrication procedures appropriate for production of precast components without effectively departing from the disclosed invention. A plurality of material choices and processes are anticipated for attaching (2) the debonding layer to (1) the prismatic portion of the Prefabricated Link Slab and shall be considered inclusive in the present invention.

A plurality of methods is anticipated for developing (1rs) the roughened surfaces of (1) the prismatic portion of the Prefabricated Link Slab and shall be considered inclusive in the present invention.

The invention claimed is:

1. A method of manufacturing a prefabricated link slab joint connection, the method including:
determining a size and shape of the prefabricated link slab joint connection to provide a flush connection of top surfaces of decks of respective connecting spans of a bridge superstructure, the bridge superstructure further including top flanges, webs, and bottom flanges that are under the decks;
in a controlled factory environment, setting reinforcing bars to correspond to the decks of the respective connecting spans; and
in the controlled factory environment, pouring Ultra High-Performance Concrete (UHPC) including over a central portion of the reinforcing bars;
in the controlled factory environment, curing the UHPC into the prefabricated link slab joint connection, wherein
the size and shape of the prefabricated link slab joint connection corresponds to cut-out portions of the top surfaces of the decks of the respective connecting spans, and
a top to bottom thickness measurement of the prefabricated link slab joint connection is less than a top to bottom thickness measurement of the decks of the respective connecting spans.

2. The method of claim 1, wherein the determining of the size and shape of the prefabricated link slab joint connection is performed based on measurements of the cut-out portions of the top surfaces of the decks of the respective connecting spans.

3. The method of claim 1, wherein the pouring includes pouring such that the reinforcing bars extend completely through the central portion and protrude from at least two sides of the central portion.

4. The method of claim 1, wherein the pouring includes pouring such that the reinforcing bars do not extend completely through the central portion and protrude from at least two sides of the central portion.

5. The method of claim 1, further comprising:
embedding at least a portion of a debonding layer into at least a portion of the prefabricated link slab joint connection.

6. The method of claim 5, wherein the embedding of the at least a portion of the debonding layer comprises embedding the at least a portion of the debonding layer into a bottom of the prefabricated link slab joint connection.

7. A method of manufacturing a prefabricated link slab joint connection, the method including:
on-site, measuring cut-out portions of top surfaces of decks of slabs of respective connecting spans of a bridge superstructure, the bridge superstructure further including top flanges, webs, and bottom flanges that are under the decks;
determining a size and shape of the prefabricated link slab joint connection to provide a flush connection of the top surfaces of the decks of the slabs of the respective connecting spans of the bridge superstructure based on the measured cut-out portions of the top surfaces of the decks;
in a controlled factory environment, setting reinforcing bars corresponding to the decks of the slabs of the respective connecting spans;
in the controlled factory environment, pouring Ultra High-Performance Concrete (UHPC) over a central portion of the reinforcing bars;
in the controlled factory environment, curing the UHPC into the prefabricated link slab joint connection, and
on-site, installing the prefabricated link slab joint connection to provide a flush connection of the decks of the slabs of the respective connecting spans of the bridge superstructure, wherein
the setting of the reinforcing bars includes setting the reinforcing bars to extend completely through the central portion and protrude from at least two sides of the central portion in a configuration for attachment to the decks of the slabs of the respective connecting spans.

8. The method of claim 7, wherein the decks of the slabs of the respective connecting spans of the bridge superstructure form a bridge deck.

9. The method of claim 7, wherein the measuring, determining, assembling, setting, pouring, curing, and installing are repeated a plurality of times such that a plurality of prefabricated link slab joint structures are provided, and
- the plurality of prefabricated link slab structures are installed in a plurality of stages.

10. A prefabricated link slab joint structure, comprising:
- a central portion of the prefabricated link slab joint structure, the central portion being formed of factory cured Ultra High-Performance Concrete (UHPC); and
- factory-set reinforcing bars projecting from one or more sides of the central portion of the prefabricated link slab joint structure to correspond to decks of respective connecting spans of a bridge superstructure, the bridge superstructure further including top flanges, webs, and bottom flanges that are under the decks,
- the prefabricated link slab joint structure is dimensioned to be received within cut-out portions of top surfaces of the decks to provide a flush connection of the top surfaces of the decks, and
- a top to bottom thickness measurement of the prefabricated link slab joint structure is less than a top to bottom thickness measurement of the decks of the respective connecting spans.

11. The method of claim 7, wherein the measuring, determining, assembling, setting, pouring, curing, and installing are repeated a plurality of times such that a plurality of prefabricated link slab joint connections are provided, and
- the plurality of link slab joint connections are installed in a plurality of sequences.

* * * * *